March 28, 1967  A. M. CREIGHTON, JR., ETAL  3,311,265
DOUBLE-BARRELED DISPENSING GUN
Filed June 3, 1965  2 Sheets-Sheet 2
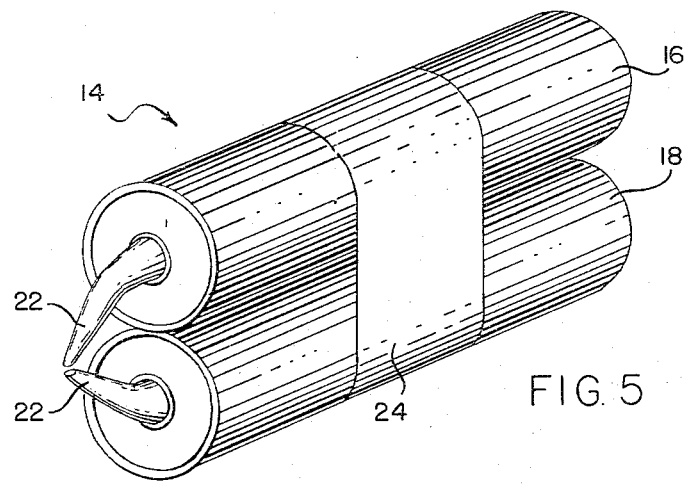
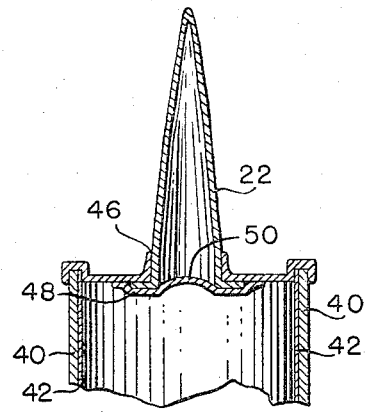
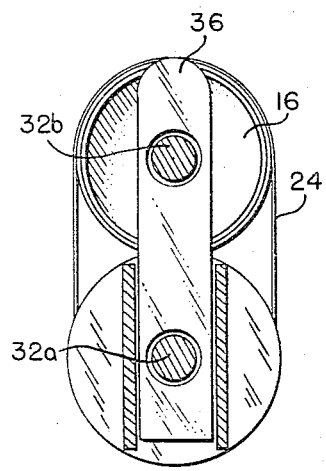
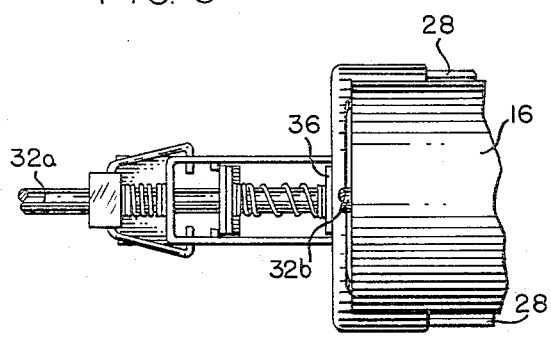
INVENTORS
ALBERT M. CREIGHTON, JR.
WILLIAM D. DEVANEY
BY United States Patent Office 3,311,265
Patented Mar. 28, 1967

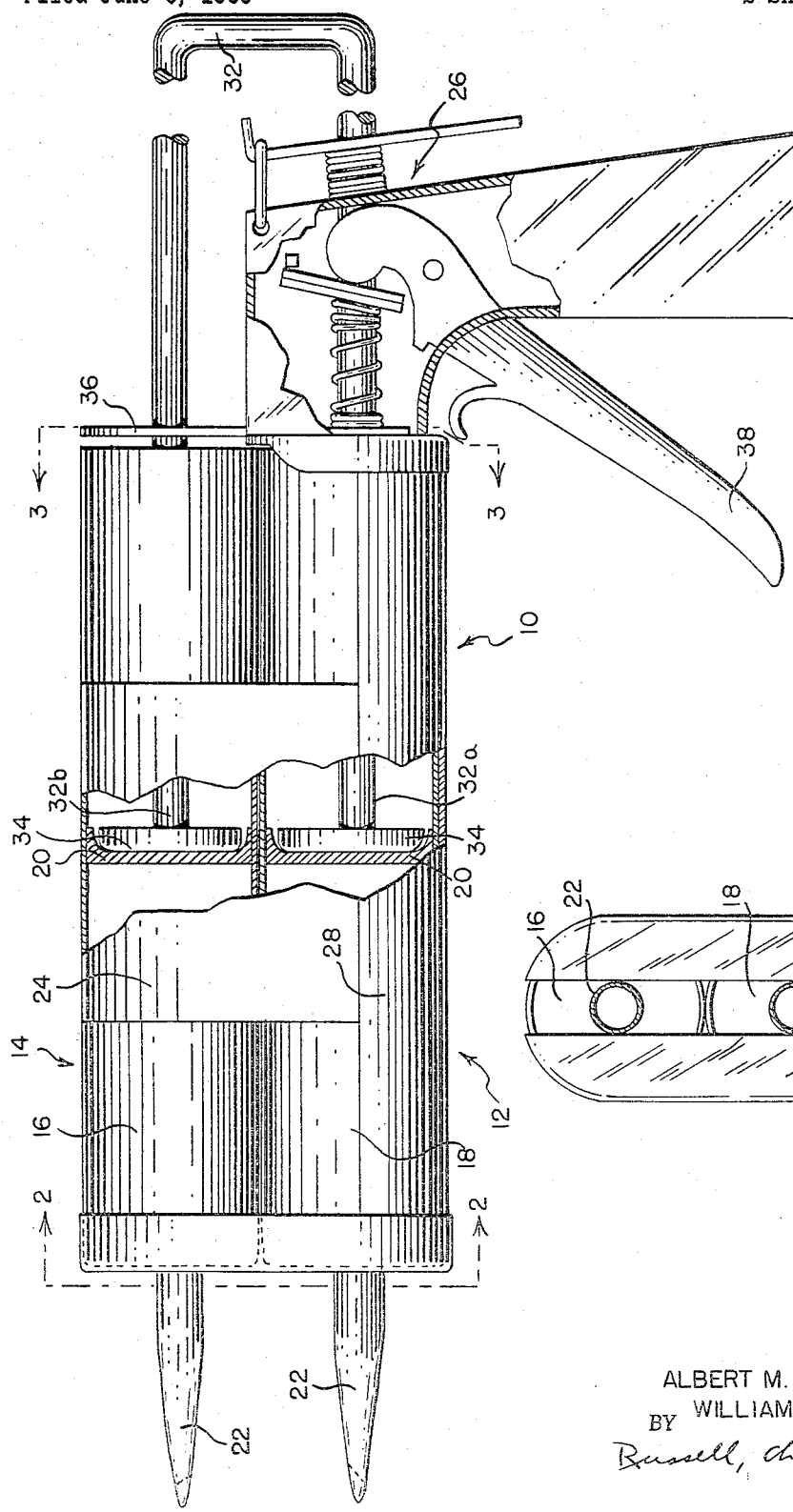

3,311,265
DOUBLE-BARRELED DISPENSING GUN
Albert M. Creighton, Jr., Manchester, and William D. Devaney, Methuen, Mass., assignors to Chemical Development Corporation, Danvers, Mass., a corporation of Massachusetts
Filed June 3, 1965, Ser. No. 460,970
2 Claims. (Cl. 222—137)

This invention relates to dispensing apparatus and more particularly to apparatus for simultaneously dispensing metered quantities of one or more viscous substances from a plural chambered cartridge.

The introduction of epoxy adhesives in the industrial and home consumer markets has raised a number of problems in the areas of material storage, handling and dispensing which are directly attributable to the unique chemical properties of epoxy adhesives. Epoxy adhesives generally comprise two separate components, an epoxy resin and a hardener or catalyst which are mixed together in predetermined proportions immediately before being used. If the two components are accidentally mixed together before their intended use, the epoxy resin will "cure" or harden and thereafter cannot be used as an adhesive. This characteristic of epoxy adhesives dictates that the epoxy resin and hardener be stored in separate containers until they are deliberately mixed together by the user.

Various means have been devised to store and dispense epoxy resins and hardeners. One example which is familiar to the home handyman is the two tube blister pack found in many hardware and houseware outlets. One of the squeeze or "toothpaste" type tubes contains the epoxy resin while the other tube contains the hardener. To use the epoxy adhesive, equal amounts of resin and hardener are squeezed out of the two tubes onto a disposable pallet. The resin and hardener are then mixed together and applied to the work surface.

It is often difficult to squeeze out the required proportional amounts of the resin and hardener, if less than the entire contents of each tube are used. Several different types of windup key devices and roller mechanisms have been proposed to simplify the necessary dispensing and metering operations for epoxy resins and hardeners. However, such devices and mechanisms are not practical for industrial use and are feasible for home use only with relatively small squeeze tube containers. In addition they are generally difficult to operate and tend to be rather cumbersome.

It is accordingly an object of the present invention to provide a hand held and actuated gun type dispenser for simultaneously discharging metered quantities of viscous substances, such as for example, an epoxy resin and hardener.

It is another object of the invention to provide a disposable viscous substance filled plural chambered cartridge for use in such a dispenser.

It is another object of the invention to provide discharge spout means for dispensing parallel, spaced streams of the viscous substances in the cartridge cylinders or parallel, abutting streams of such materials.

It is a feature of the invention that the dispenser gun is relatively inexpensive to manufacture and can be partially fabricated from the readily available components used in conventional caulking guns.

In the accomplishment of these objects, we modify a conventional caulking gun to accept a disposable cartridge assembly comprising two viscous substance filled cylindrical containers which are strapped together in side-by-side, contacting relation so that the containers can be loaded into and removed from the gun as a unit. Each container is provided with a temporarily closed dispensing spout at one end and an axially movable plug positioned within the container at the other end to seal the contents of the container until the cartridge is ready to be used.

When the cartridge is loaded into the modified caulking gun, the container discharge spouts point away from the trigger or handle end of the gun while the two container sealing plugs are located immediately in front of a dual piston device. A conventional trigger actuated caulking gun drive mechanism is employed to incrementally advance a modified piston rod assembly having an annular piston positioned within each of the cartridge cylinders. Thus each time the trigger is pulled, both pistons advance the same distance in their respective cylinders thereby forcing equal amounts of material from each cylinder.

These objects and other objects and features of the present invention will be best understood following description of a preferred embodiment of the invention, selected for purposes of illustration, and shown in the accompanying drawings in which:

FIG. 1 is a view in side elevation of the dispensing apparatus showing a dual piston dispensing gun and a disposable viscous substance filled cartridge held within the gun;

FIG. 2 is a view in cross section taken along lines 2—2 of FIG. 1;

FIG. 3 is a view in cross section taken along lines 3—3 of FIG. 1;

FIG. 4 is a plan view of a portion of the dispensing apparatus;

FIG. 5 is an isometric view of the disposable cartridge assembly showing a modified dispensing spout arrangement; and, FIG. 6 is a view in cross section showing a dispensing spout and a portion of one of the cylindrical containers.

Turning now to the drawings, and particularly to FIG. 1 thereof, there is shown in side elevation a preferred embodiment of a dispensing apparatus constructed in accordance with the present invention and indicated by the reference numeral 10. The dispensing apparatus 10 has two major components: a modified pistol grip dispensing gun 12 and a disposable cartridge 14 which is removable held in the gun 12 as hereinafter described. The disposable cartridge 14 comprises two, rigid substantially cylindrical containers 16 and 18 each containing a viscous substance, such as for example, an epoxy resin and hardener. The cartridge containers 16 and 18 can be made of any sufficiently rigid material which is impervious to the viscous substances stored therein. For example, polyethylene plastic and aluminum foil lined cardboard have been found to fulfill the structural requirements for the cartridge containers 16 and 18. The ends of each container are sealed by means of an axially movable annular plug 20 and a temporarily closed dispensing spout 22. Similar materials can be used for the dispensing spout 22 and annular sealing plug 20, however, preferably the dispensing spout 22 is made of a molded polyethylene plastic. If the containers are made of polyethylene plastic, the dispensing spout can be molded as an integral parts of the container.

In order to facilitate loading the cartridge containers 16 and 18 into the modified dispensing gun 12 and to simplify the removal of the empty containers, the two containers are secured together in superposed relation by means of a strap 24 as shown in FIGS. 1, 3 and 5. Alternatively, double straps can be employed at the ends of the containers 16 and 18. Other suitable means, can, of course, be used to secure the two containers together in superposed relation. If the containers are made of polyethylene plastic, they can be integrally molded as a single unit thereby obviating the need for strap 24. It will be appreciated that when the containers 16 and 18 are strapped together as shown in the aforementioned figures, or integrally molded, the cartridge 14 can be handled as a unit when it is inserted into and removed from the dispensing gun 12.

It is contemplated that the cartridge 14 would be sold as a unit with the containers 16 and 18 strapped together or integrally molded as a single piece. However, since it may be desirable in some circumstances to individually insert each container into the gun, it should be understood that the present invention is not limited to the strapped container configuration shown in FIGS. 1, 3 and 5, nor the integrally molded unit described above, but instead, is directed to the broader concept of two viscous substance filled containers removably held in a dual piston actuating hand gun.

The dispensing gun 12 depicted in FIG. 1 is essentially a conventional caulking gun which has been modified, as hereinafter described, to accept the disposable, double cylinder cartridge 14. The standard components of a conventional caulking gun are easily recognized in FIG. 1 and consist of a piston actuating mechanism, indicated generally by the reference numeral 26, a semi-cylindrical barrel 28 secured to the forward end of the actuating mechanism 26 and a slotted faceplate 30 mounted on the distal end of barrel 28. Referring to FIG. 2, it can be seen that the slotted faceplate 30 has been modified by extending the faceplate in an upwardly direction so that the slot has sufficient depth to accommodate both of the dispenser spouts 22. The conventional caulking gun is further modified by providing a U-shaped piston rod 32 having annular pistons 34 mounted on the ends of the upper and lower portions 32a and 32b, respectively, of the piston rod. The alignment of the upper and lower portions of the piston rod 32 with respect to the axis of the gun barrel 28 and, hence, the axis of the cartridge cylinders 16 and 18 is maintained by a double apertured piston support plate 36 which is illustrated in FIGS. 1, 3 and 4.

The operation of the modified dispensing gun 12 shown in FIG. 1 is essentially the same as a conventional caulking gun since the lower portion 32a of the modified piston rod corresponds to the piston rod in a conventional caulking gun. Thus when trigger 38 is pulled, the lower portion of piston rod 32 is advanced by the actuating mechanism 26 for a predetermined distance along the axis of the lower cartridge cylinder 18. It will be appreciated that since the modified piston rod 32 has a U-shaped configuration, the upper portion of the piston rod also will be advanced by the same amount along the axis of the upper cylinder 16. It should be understood that the piston actuating mechanism depicted in FIG. 1 is merely illustrative and that other well known mechanisms, such as a ratchet drive means, can be employed in the dispensing gun 12 without departing from the spirit of the invention.

Turning now to FIG. 5, there is shown in isometric view a disposable cartridge 14 having a modified dispensing spout arrangement. As mentioned previously, it is one of the objects of the present invention to provide dispensing means for dispensing either parallel, spaced streams of the viscous substances stored within containers 16 and 18 or parallel, abutting streams of such substances. FIG. 1 illustrates the dispensing spout configuration employed to obtain parallel spaced streams of the viscous substances. Parallel, abutting streams are obtained by using dispensing spout arrangement shown in FIG. 5 wherein the spouts 22 are angled towards each other by a predetermined amount so that the substances are ejected therefrom in parallel abutting relation.

The construction of the dispensing spouts 22 and the associated cylindrical containers are shown in greater detail in the cross-sectional view of FIG. 6. The cylindrical container is shown in this figure, by way of illustration, with cardboard outer walls 40 and an inner lining of aluminum foil 42. An annular end piece 44 is press fitted over one end of the container and has a coaxial annular opening 46 through which extends the dispensing spout 22.

The inner end of the dispensing spout 22 may be sealed by a foil member 48 having formed therein dimple 50. When the dispensing apparatus 10 is ready to be used, the dispensing spouts 22 are cut along the dashed lines as shown in FIG. 1. If the dispensing spout is provided with an inner foil member seal 48, the seal can be ruptured by a suitably pointed instrument, such as, for example, an ice pick after the dispensing spouts have been cut along the dashed lines. Alternatively, the seal can be ruptured by the pressure exerted on the dimpled portion of the seal when the pistons 34 are forced against the annular sealing plugs 20.

Although the containers 16 and 18 have been depicted in the drawings as having equal diameters in order to dispense equal amounts of the viscous substances, it should be understood that unequal diameter containers can be employed to obtain a metering ratio other than 1:1. Different diameter pistons can also be used if the size difference between the container diameters is too great to accept the pistons depicted in FIG. 1.

Having described a preferred embodiment of the viscous substance dispensing apparatus, it will now be apparent to those skilled in the art that numerous modifications can be made to the apparatus without departing from the spirit of the invention.

What we claim is:

1. In a viscous substance dispensing apparatus the combination of a dispensing gun comprising a pistol grip, dual piston actuating assembly and a semi-cylindrical barrel secured to said assembly, said barrel having a slotted face plate mounted on the distal end thereof and, two rigid, substantially cylindrical, viscous substance filled containers each having axially movable means for sealing one end and a dispensing spout at the other end, said containers being removably held in said gun in side-by-side, contacting relation with said pistons positioned within the containers for reciprocatory movement therein and with said dispensing spouts extending through and beyond said slotted faceplate.

2. In a viscous substance dispensing apparatus, the combination of: a dispensing gun comprising a piston grip actuating assembly for a U-shaped piston rod having an annular piston mounted on each end thereof, a semi-cylindrical barrel secured to said assembly and a slotted faceplate mounted on the distal end of said barrel normal to the axis thereof; and, a plural chambered cartridge comprising two rigid, substantially cylindrical, viscous substance filled containers each having axially movable means for sealing one end and a dispensing spout at the other end, said containers being secured together in side-by-side, contacting relation and removably held in said gun with said pistons positioned within the containers for reciprocatory movement therein and with said dispensing spouts extending through and beyond said slotted faceplate.

References Cited by the Examiner

UNITED STATES PATENTS

| | | | |
|---|---|---|---|
| 1,934,632 | 11/1933 | Frick | 222—135 |
| 2,367,346 | 1/1945 | Good | 222—391 X |
| 2,582,156 | 1/1952 | Peterson | 222—391 X |
| 2,679,281 | 5/1954 | Paulucci. | |
| 2,889,085 | 6/1959 | Collins | 222—391 |
| 2,933,866 | 4/1960 | Cranston | 53—3 |
| 3,023,554 | 3/1962 | Hlavacek et al. | 53—3 |
| 3,159,312 | 12/1964 | Van Scriver | 222—137 |
| 3,162,337 | 12/1964 | Sabaka | 222—327 |
| 3,166,221 | 1/1965 | Nielsen | 222—137 |
| 3,211,347 | 10/1965 | Phillips | 222—327 |

FOREIGN PATENTS 678,596    1/1964    Canada.

RAPHAEL M. LUPO, *Primary Examiner.*